(12) United States Patent
Huang

(10) Patent No.: US 8,619,299 B2
(45) Date of Patent: Dec. 31, 2013

(54) PRINTING SYSTEM AND PRINTING METHOD FOR PORTABLE COMMUNICATION DEVICE

(75) Inventor: Wei-Yin Huang, Taoyuan Hsien (TW)

(73) Assignee: Teco Image System Co., Ltd., Kuang-In, Taoyuan Hsien (TW)

( * ) Notice: Subject to any disclaimer, the term of this patent is extended or adjusted under 35 U.S.C. 154(b) by 228 days.

(21) Appl. No.: 13/085,057

(22) Filed: Apr. 12, 2011

(65) Prior Publication Data

US 2012/0236358 A1 Sep. 20, 2012

(30) Foreign Application Priority Data

Mar. 17, 2011 (TW) .............................. 100109165 A

(51) Int. Cl.
*G06F 3/12* (2006.01)
(52) U.S. Cl.
USPC ..................... 358/1.15; 358/426.08; 358/407; 709/206; 709/217; 709/220; 709/228
(58) Field of Classification Search
USPC ....................................................... 358/1.15
See application file for complete search history.

(56) References Cited

U.S. PATENT DOCUMENTS

| 2002/0178250 A1* | 11/2002 | Haartsen | 709/223 |
| 2009/0296151 A1* | 12/2009 | Konji et al. | 358/1.15 |
| 2012/0105475 A1* | 5/2012 | Tseng | 345/633 |

* cited by examiner

*Primary Examiner* — Twyler Haskins
*Assistant Examiner* — Brendan McCommas

(57) ABSTRACT

A printing system includes a portable communication device, a printing device and plural transmission channels. The printing device is used for receiving a to-be-printed data from the portable communication device, thereby performing a printing task. The plural transmission channels are selectively in communication with the portable communication device and the printing device for transferring the to-be-printed data to the printing device. The portable communication device includes a controlling unit for judging and setting priority values of the transmission channels and selecting one of the transmission channels as a priority transmission channel according to the priority values of the transmission channels, so that the to-be-printed data is transmitted from the portable communication device to the printing device through the priority transmission channel.

13 Claims, 6 Drawing Sheets

PRINTING SYSTEM AND PRINTING METHOD FOR PORTABLE COMMUNICATION DEVICE

PRIORITY CLAIM

The present application claims priority to Taiwanese Patent Application No. 100109165, which was filed on Mar. 17, 2011.

FIELD OF THE INVENTION

The present invention relates to a printing system and a printing method, and more particularly to a printing system and a printing method for a portable communication device so as to automatically judge, set and select a desired transmission channel.

BACKGROUND OF THE INVENTION

With increasing development of science and technology, a variety of portable communications devices (e.g. smart phones or tablet personal computers) are designed to have novel functions. For example, the trends of designing the smart phones are toward small size, light weightiness, integrated functions, high data processing and computing speed and easy portability. In addition to the basic functions of typical mobile phones, the smart phones have many expansive functions such as video playback functions, Bluetooth communication functions, digital camera functions, file access functions, wireless internet access functions, and the like. Consequently, the portable communications devices become indispensable electronic devices in our daily lives.

However, for most portable communications devices, the to-be-printed data usually fails to directly printed by a printer or a multifunction peripheral. Generally, the to-be-printed data of the portable communications device is stored into a built-in micro memory card, and then the to-be-printed data is transferred from the micro memory card to an external computer to be read out. Alternatively, after the portable communications device is in communication with a computer through a transmission line, the user may operate the computer to transmit the to-be-printed data to the printing device to be printed out. Since the conventional method of printing the data of the portable communications device is not user-friendly, a Bluetooth wireless communication approach is used to solve the drawbacks. In the Bluetooth wireless communication approach, a portable communications device with a Bluetooth wireless communication module is in communication with a printing device with another Bluetooth wireless communication module, and then the to-be-printed data of the portable communications device is wirelessly transmitted to the printing device to be printed out.

However, in the current printing system and method, only a single transmission channel is used to perform data transmission. In a case that the transmission channel between the portable communications device and the printing device fails to be effectively established, the printing device fails to be performed. That is, the conventional printing method is inconvenient. Moreover, when the user wants to perform the printing task, the user usually fails to realize whether any transmission channel between the portable communications device and the printing device is available, and fails to realize whether the transmission channel is established. Moreover, even if plural transmission channels between the portable communications device and the printing device are available, the conventional printing method fails to automatically select an optimal transmission channel with good transmission quality, quick transmission speed and/or low printing cost.

SUMMARY OF THE INVENTION

The present invention provides a printing system and a printing method for automatically judging the available transmission channels and selecting one of the transmission channels as a priority transmission channel according to the priority values of said transmission channels.

The present invention also provides a printing system and a printing method for automatically selecting an optimal transmission channel with butter transmission quality, quicker transmission speed and/or lower printing cost.

In accordance with an aspect of the present invention, there is provided a printing system. The printing system includes a portable communication device, a printing device and plural transmission channels. The printing device is used for receiving a to-be-printed data from the portable communication device, thereby performing a printing task. The plural transmission channels are selectively in communication with the portable communication device and the printing device for transferring the to-be-printed data to the printing device. The portable communication device includes a controlling unit for judging and setting priority values of the transmission channels and selecting one of the transmission channels as a priority transmission channel according to the priority values of the transmission channels, so that the to-be-printed data is transmitted from the portable communication device to the printing device through the priority transmission channel.

In accordance with another aspect of the present invention, there is provided a printing method. The printing method includes the steps of (a) providing a portable communication device, a printing device and plural transmission channels, wherein the transmission channels are selectively in communication with the portable communication device and the printing device, (b) allowing the portable communication device to judge whether plural transmission channels between the portable communication device and the printing device are available, and setting priority values of the plural transmission channels, (c) automatically selecting one of the plural transmission channels as a priority transmission channel according to the priority values of the transmission channels, and transmitting the to-be-printed data from the portable communication device to the printing device through the priority transmission channel, and (d) performing a printing task after the to-be-printed data is received by the printing device.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
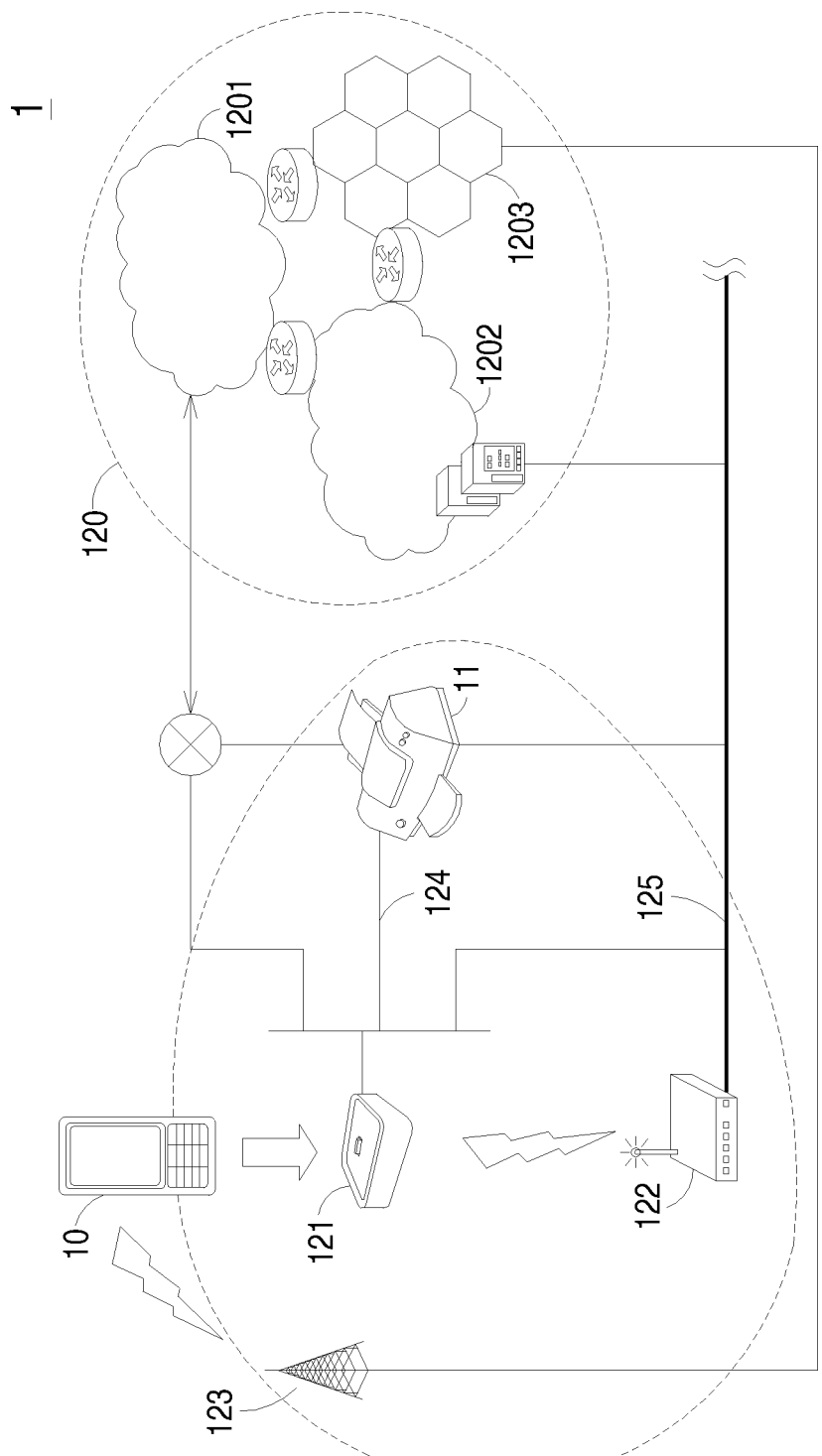
FIG. 1A schematically illustrates the architecture of a printing system according to an embodiment of the present invention.
Figure 1B:
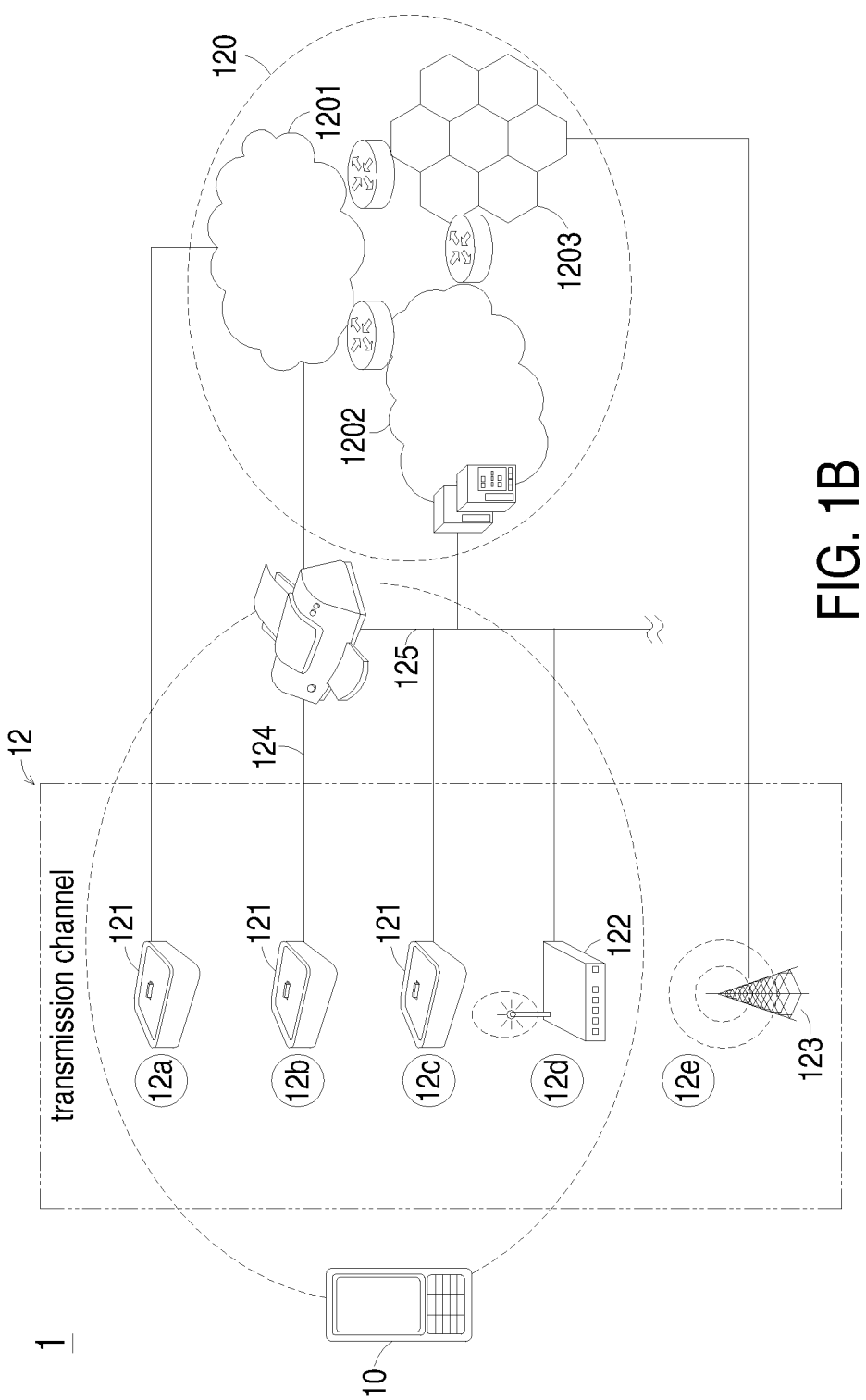
FIG. 1B schematically illustrates plural transmission channels of the printing system of FIG. 1A.

FIG. 1A schematically illustrates the architecture of a printing system according to an embodiment of the present invention. FIG. 1B schematically illustrates plural transmission channels of the printing system of FIG. 1A. As shown in FIGS. 1A and 1B, the printing system 1 comprises a portable communication device 10, a printing device 11 and plural transmission channels 12. An example of the portable communication device 10 includes but is not limited to a smart phone or a tablet personal computer. The printing device 11 is configured to receive the to-be-printed data and perform a printing task. The transmission channels 12 are selectively used to communicate the portable communication device 10 with the printing device 11. After the portable communication device 10 and the printing device 11 are in communication with each other, the to-be-printed data may be transmitted from the portable communication device 10 to the printing device 11 and thus printed by the printing device 11. In an embodiment, the portable communication device 10 comprises a controlling unit 101. The controlling unit 101 is configured to judge and set the priority values of the transmission channels 12 and select one of the transmission channels 12 as a priority transmission channel according to the priority values of the transmission channels 12. Consequently, the to-be-printed data is transmitted from the portable communication device 10 to the printing device 11 through the priority transmission channel. In an embodiment, the priority value of each transmission channel 12 includes a parameter indicating whether the communication between the portable communication device 10 and the printing device 11 is established. The other parameters of priority value of each transmission channel 12 include the data transmission speed of the transmission channel 12, the data transmission cost of the transmission channel 12, the data transmission stability of the transmission channel 12, and the combination thereof.

Figure 2:
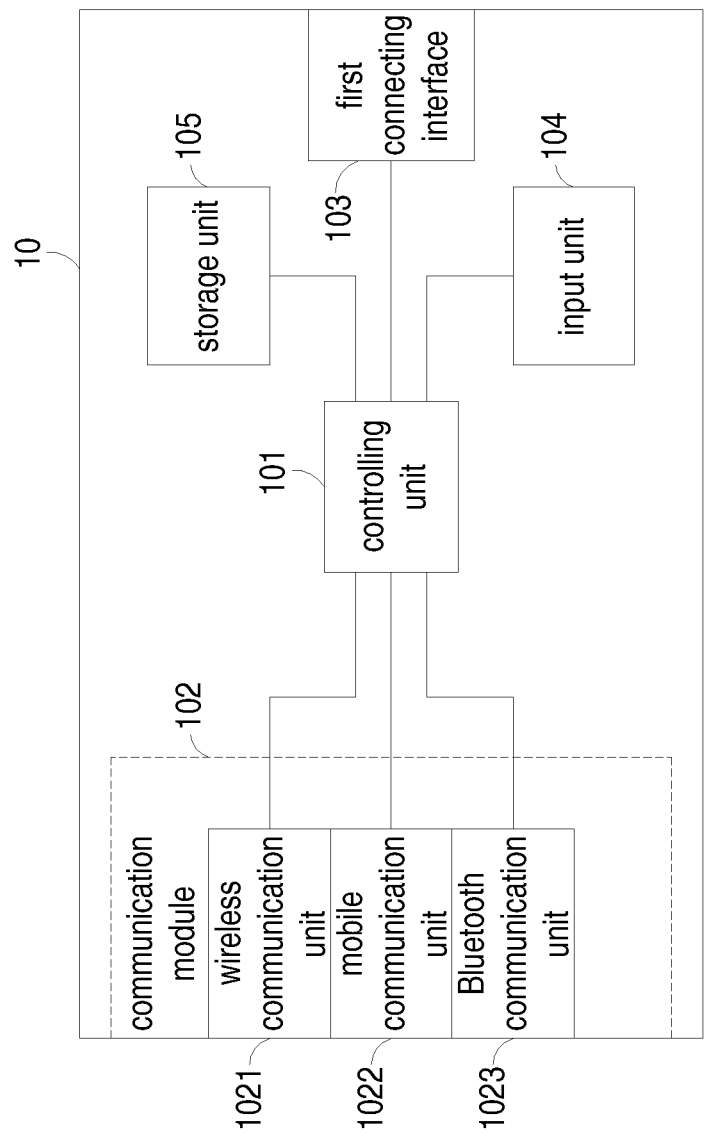
FIG. 2 is a schematic functional block diagram illustrating the portable communication device used in the printing system of FIGS. 1A and 1B.

FIG. 2 is a schematic functional block diagram illustrating the portable communication device used in the printing system of FIGS. 1A and 1B. The portable communication device 10 comprises a controlling unit 101, a communication module 102, a first connecting interface 103, an input unit 104 and a storage unit 105. The communication module 102, the first connecting interface 103, the input unit 104 and the storage unit 105 are connected with the controlling unit 101. In response to an input signal outputted from the input unit 104, the operations of the portable communication device 10 are controlled by the controlling unit 101. For example, in response to the input signal outputted from the input unit 104, the controlling unit 101 executes a printing program to perform a printing task of printing the to-be-printed data. The communication module 102 comprises a wireless communication unit 1021 (e.g. a WiFi communication unit), a mobile communication unit 1022 (e.g. a 3 G communication unit), a Bluetooth communication unit 1023, and a combination thereof. An example of the first connecting interface 103 includes but is not limited to a USB connecting port. In response to an input action of the user on the input unit 104, the input unit 104 outputs the input signal. The storage unit 105 is used for storing the to-be-printed data.

Please refer to FIGS. 1A, 1B and 2. An example of the printing device 11 includes but is not limited to a printer or a multifunction peripheral. The printing device 11 is in communication with the transmission channels 12 for receiving the to-be-printed data from the portable communication device 10 and performing the printing task in response to a printing request from the portable communication device 10. In this embodiment, the transmission channels 12 comprise wired transmission channels and wireless transmission channels. In this embodiment, the transmission channels 12 comprises a first transmission channel 12a, a second transmission channel 12b, a third transmission channel 12c, a fourth transmission channel 12d and a fifth transmission channel 12e. The first transmission channel 12a is defined by a docking station 121 and a public switched telephone network (PSTN) 1201 of a bridge network system 120. The second transmission channel 12b is defined by the docking station 121 and a USB connecting wire 124. The third transmission channel 12c is defined by the docking station 121, a local area network 125 and the internet 1202 of the bridge network system 120. The fourth transmission channel 12d is defined by a wireless network device 122, the local area network 125 and the internet 1202 of the bridge network system 120. The fifth transmission channel 12e is defined by a base station 123 and a mobile communication network 1203, a public telephone network 1201 and the internet 1202 of the bridge network system 120.

In this embodiment, the bridge network system 120 comprises the public switched telephone network (PSTN) 1201, the internet 1202, the mobile communication network 1203, and the combination thereof. The public switched telephone network 1201, the internet 1202 and the mobile communication network 1203 of the bridge network system 120 may be selectively employed to receive, transmit and exchange data. In this embodiment, the docking station 121 is in communication with the public switched telephone network 1201, the USB connecting wire 124 and the local area network 125. The wireless network device 122 is in communication with the local area network 125. The base station 123 is in communication with the mobile communication network 1203 of the bridge network system 120. In this embodiment, the printing device 11 is directly in communication with the public switched telephone network 1201 of the bridge network system 120, the USB connecting wire 124 and the local area network 125, so that the to-be-printed data from the portable communication device 10 can be transmitted to the printing device 10.

The first transmission channel 12a is defined by the docking station 121 and the public switched telephone network 1201 of the bridge network system 120. The first connecting interface 103 of the portable communication device 10 is connected with and in communication with the docking station 121. The docking station 121 is in communication with the public switched telephone network 1201 of the bridge network system 120. In addition, the printing device 11 is in communication with the public switched telephone network 1201 of the bridge network system 120. Via the first transmission channel 12a, the to-be-printed data may be transmitted from the portable communication device 10 to the printing device 11 in a faxing manner.

The second transmission channel 12b is defined by the docking station 121 and the USB connecting wire 124. The first connecting interface 103 of the portable communication device 10 is connected with and in communication with the docking station 121. The docking station 121 is in communication with the printing device 11 through the USB connecting wire 124. Via the second transmission channel 12b, the to-be-printed data may be transmitted from the portable communication device 10 to the printing device 11.

The third transmission channel 12c is defined by the docking station 121, the local area network 125 and the internet 1202 of the bridge network system 120. The first connecting interface 103 of the portable communication device 10 is connected with and in communication with the docking station 121. The docking station 121 is in communication with the local area network 125. The local area network 125 is also in communication with the internet 1202 of the bridge network system 120. The printing device 11 is also in communication with the internet 1202 of the bridge network system 210. Via the third transmission channel 12c, the to-be-printed data may be transmitted from the portable communication device 10 to the printing device 11.

The fourth transmission channel 12d is defined by the wireless network device 122, the local area network 125 and the internet 1202 of the bridge network system 120. The wireless communication unit 1021 of the portable communication device 10 is in wireless communication with the wireless network device 122. The wireless network device 122 is also in communication with the local area network 125. The local area network 125 is also in communication with the internet 1202 of the bridge network system 210. The printing device 11 is also in communication with the internet 1202 of the bridge network system 210. Via the fourth transmission channel 12d, the to-be-printed data may be transmitted from the portable communication device 10 to the printing device 11.

The fifth transmission channel 12e is defined by the base station 123 and the mobile communication network 1203, the public telephone network 1201 and the internet 1202 of the bridge network system 120. The mobile communication unit 1022 of the portable communication device 10 is in wireless communication with the base station 123. The base station 123 is also in communication with the mobile communication network 1203 of the bridge network system 120. The mobile communication network 1203 is selectively in communication with the public switched telephone network 1201 and the internet 1202 to receive, transmit and exchange data. The printing device 11 is in communication with the public switched telephone network 1201 and the internet 1202. Via the fifth transmission channel 12e, the to-be-printed data may be transmitted from the portable communication device 10 to the printing device 11.

The number and types of the transmission channels 12 of the printing system 1 may be varied according to the practical requirements. That is, any transmission channel may be used in the printing system 1. For example, the Bluetooth communication unit 1023 of the portable communication device 10 and a Bluetooth communication unit (not shown) of the printing device 11 may be collectively defined as another transmission channel. Moreover, the hardware components of each transmission channel may be varied according to the practical requirements.

Figure 3:
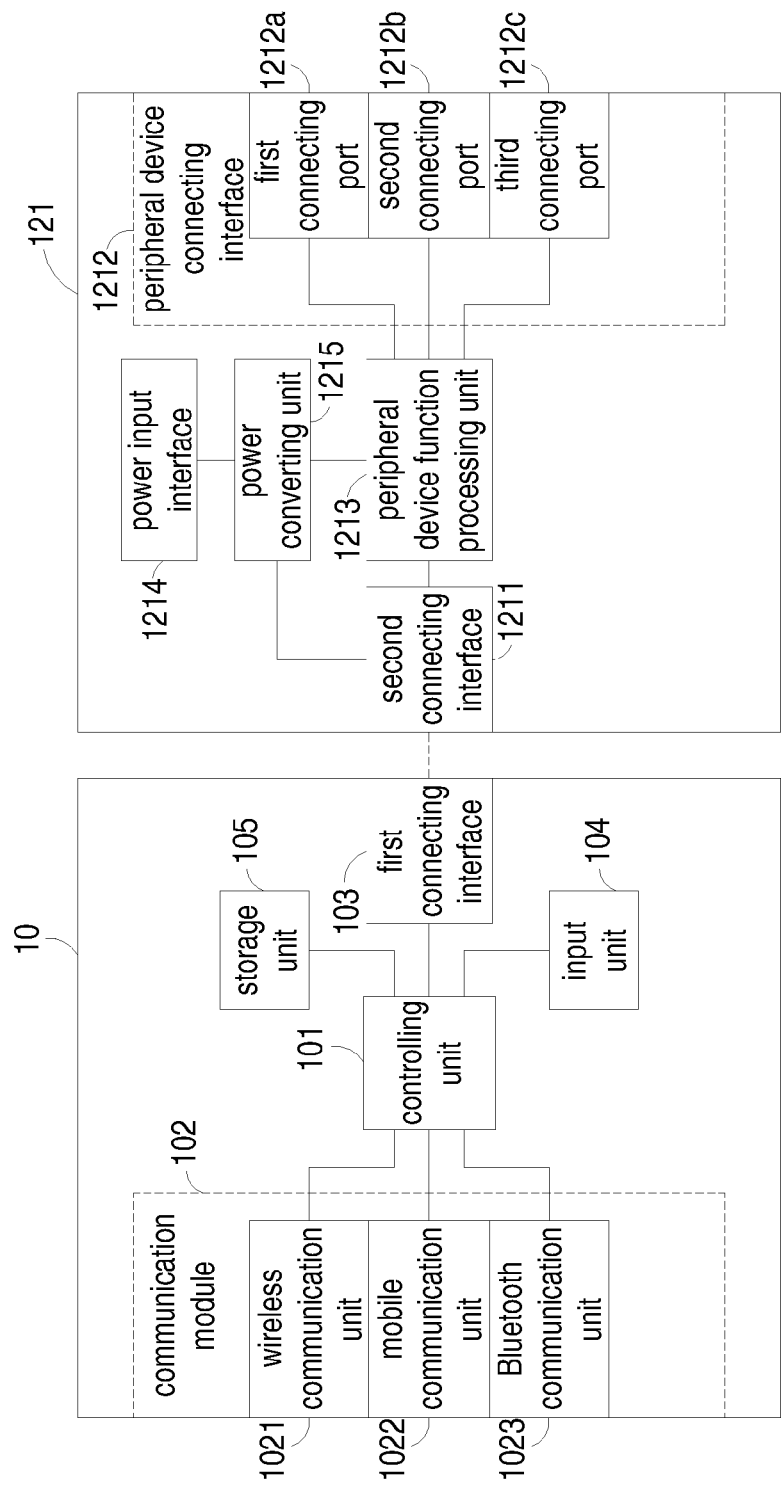
FIG. 3 is a schematic functional block diagram illustrating the communication between the portable communication device and the docking station of the printing system of FIGS. 1A and 1B.

FIG. 3 is a schematic functional block diagram illustrating the communication between the portable communication device 10 and the docking station of the printing system of FIGS. 1A and 1B. Please refer to FIGS. 1A, 1B, 2 and 3. The docking station 121 is detachably connected with the portable communication device 10. In addition, the docking station 121 may provide electricity to the portable communication device 10. The docking station 121 comprises a second connecting interface 1211, a peripheral device connecting interface 1212, a peripheral device function processing unit 1213, a power input interface 1214 and a power converting unit 1215. The second connecting interface 1211 may be coupled with the first connecting interface 103 of the portable communication device 10. The peripheral device connecting interface 1212 comprises a first connecting port 1212a, a second connecting port 1212b and a third connecting port 1212c. For example, the first connecting port 1212a is a telephone line socket, the second connecting port 1212b is a USB socket, and the third connecting port 1212c is a RJ-45 socket. In this embodiment, the first connecting port 1212a is connected with the public telephone network 1201 of the bridge network system 120 to establish the first transmission channel 12a. The second connecting port 1212b is connected with the USB connecting wire 124 to establish the second transmission channel 12b. The third connecting port 1212c is connected with the local area network 125 to establish the third transmission channel 12c.

The power input interface 1214 may receive an input voltage and transmit the input voltage to the power converting unit 1215. The power converting unit 1215 is electrically connected with the second connecting interface 1211, the peripheral device function processing unit 1213 and the power input interface 1214 for converting the input voltage into an output voltage. The output voltage is transmitted to the portable communication device 10 and the peripheral device function processing unit 1213 for powering the portable communication device 10 and the peripheral device function processing unit 1213, respectively. The peripheral device function processing unit 1213 is connected with the second connecting interface 1211 and the peripheral device connecting interface 1212 for controlling and allocating data exchange between the second connecting interface 1211 and the peripheral device connecting interface 1212. In addition, the peripheral device function processing unit 1213 is also configured to receive the to-be-printed data from the portable communication device 10 and process the to-be-printed data or directly transmit the to-be-printed data to the peripheral device connecting interface 1212.

Figure 4:
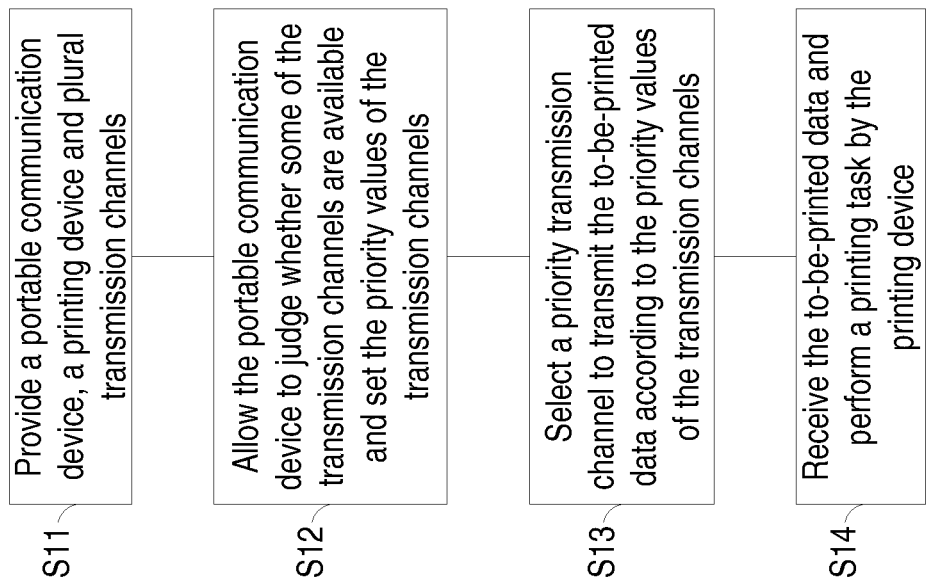
FIG. 4 is a flowchart of a printing method according to an embodiment of the present invention.

FIG. 4 is a flowchart of a printing method according to an embodiment of the present invention. Firstly, in the step S11, a portable communication device 10, a printing device 11 and plural transmission channels 12 are provided. The transmission channels 12 are selectively in communication with the portable communication device 10 and the printing device 11. Then, in the step S12, the portable communication device 10 judges whether some of the transmission channels 12 are available and sets the priority values of the transmission channels 12. According to the priority values of the transmission channels 12, the portable communication device 10 selects a priority transmission channel to transmit the to-be-printed data (Step S13). Afterwards, the printing device 11 receives the to-be-printed data and a printing task is performed (Step S14).

In an embodiment, the priority value of each transmission channel 12 includes a parameter indicating whether the communication between the portable communication device 10 and the printing device 11 is established. For example, the controlling unit 101 of the portable communication device 10 may execute a printing program to judge whether the transmission channel 12 is unavailable, has a breakdown or fails to be established. If the transmission channel 12 is unavailable, has a breakdown or fails to be established, the priority value of the transmission channel 12 is set to be "0". Whereas, if the controlling unit 101 of the portable communication device 10 judges that some of the transmission channels 12 are available and the communication between the portable communication device 10 and the printing device 11 is established, other parameters are used to determine the priority values of the available transmission channels 12. The other parameters of priority value of each transmission channel 12 include the data transmission speed of the transmission channel 12, the data transmission cost of the transmission channel 12, the data transmission stability of the transmission channel 12, and the combination thereof. Generally, the transmission channel with the higher data transmission speed has the higher priority value, the data transmission speed with the lower data transmission cost has the lower priority value, and the transmission channel with the higher data transmission stability has the higher priority value. According to the rankings of the priority values of these transmission channels 12, the portable communication device 10 will select the transmission channel 12 with the highest priority value as a priority transmission channel to transfer the to-be-printed data. That is, the printing system 1 can automatically judge and select the priority transmission channel and then perform the printing task. Alternatively, through the input unit 104 of the portable communication device 10, the user may select a designated transmission channel 12 to transfer the to-be-printed data.

Table schematically shows the priority values of the transmission channels in different usage statuses.

TABLE 1

| Transmission channel | | First | Second | Third | Fourth | Five |
|---|---|---|---|---|---|---|
| Usage status 1 | Priority | 0 | 4 | 3 | 2 | 1 |
| Usage status 2 | value | 0 | 0 | 0 | 2 | 1 |
| Usage status 3 | | 4 | 0 | 0 | 0 | 0 |

In the first usage status, the first transmission channel 12*a* is not available, but the other four transmission channels 12*b*, 12*c*, 12*d* and 12*e* are available. Consequently, the priority value of the first transmission channel 12*a* is set as "0". Since the use of the docking station 121 has higher data transmission speed, lower data transmission speed and better data transmission stability in comparison with the mobile communication or wireless networking approach, the priority values of the transmission channels 12*b*, 12*c*, 12*d* and 12*e* are set as "4", "3", "2" and "1", respectively. Since the second transmission channel 12*b* has the highest priority value, the portable communication device 10 will select the second transmission channel 12*b* as a priority transmission channel to transfer the to-be-printed data. That is, through the second transmission channel 12*b*, the to-be-printed data is transmitted to the printing device 11 to be printed out.

In the second usage status, the portable communication device 10 is not in communication with the docking station 121, and thus the transmission channels 12*a*, 12*b* and 12*c* are not available. Whereas, since the mobile communication or wireless networking approach may be used to perform the printing task, the transmission channels 12*d* and 12*e* are available. In this situation, the priority value of the transmission channels 12*a*, 12*b* and 12*c* are set as "0", but the priority values of the transmission channels 12*d* and 12*e* are set as "2" and "1", respectively. Since the fourth transmission channel 12*d* has the highest priority value, the portable communication device 10 will select the fourth transmission channel 12*d* as a priority transmission channel to transfer the to-be-printed data. That is, through the fourth transmission channel 12*d*, the to-be-printed data is transmitted to the printing device 11 to be printed out.

In the second usage status, the portable communication device 10 is only in communication with the public telephone network 1201 through the docking station 121. That is, only the first transmission channel 12*a* is available, but the other four transmission channels 12*b*, 12*c*, 12*d* and 12*e* are not available. In this situation, the priority values of the transmission channels 12*a*, 12*b*, 12*c*, 12*d* and 12*e* are set as "4", "0", "0", "0" and "0", respectively. Since the first transmission channel 12*a* has the highest priority value, the portable communication device 10 will select the first transmission channel 12*a* as a priority transmission channel to transfer the to-be-printed data. That is, through the first transmission channel 12*a*, the to-be-printed data is transmitted to the printing device 11 to be printed out.

The parameters of the priority value may be determined according to the user's requirement. For example, if the user wants to acquire the to-be-printed data at a higher speed, the prior value is determined according to the data transmission speed of the transmission channel. Whereas, if the user wants to acquire the to-be-printed data at lower cost, the prior value is determined according to the data transmission cost of the transmission channel. Whereas, if the user wants to acquire the to-be-printed data more stably the prior value is determined according to the data transmission stability of the transmission channel. In some embodiments, the prior value may be determined according to at least two of the data transmission speed, the data transmission cost and the data transmission stability.

In this embodiment, by the controlling unit 101 of the portable communication device 10, the format of the to-be-printed data of the portable communication device 10 may be converted into another format that supports the printing device 11. In such way, the printing device 11 may directly perform the printing task, so that the loading of the network transmission is reduced and the printing speed is enhanced.

Figure 5:
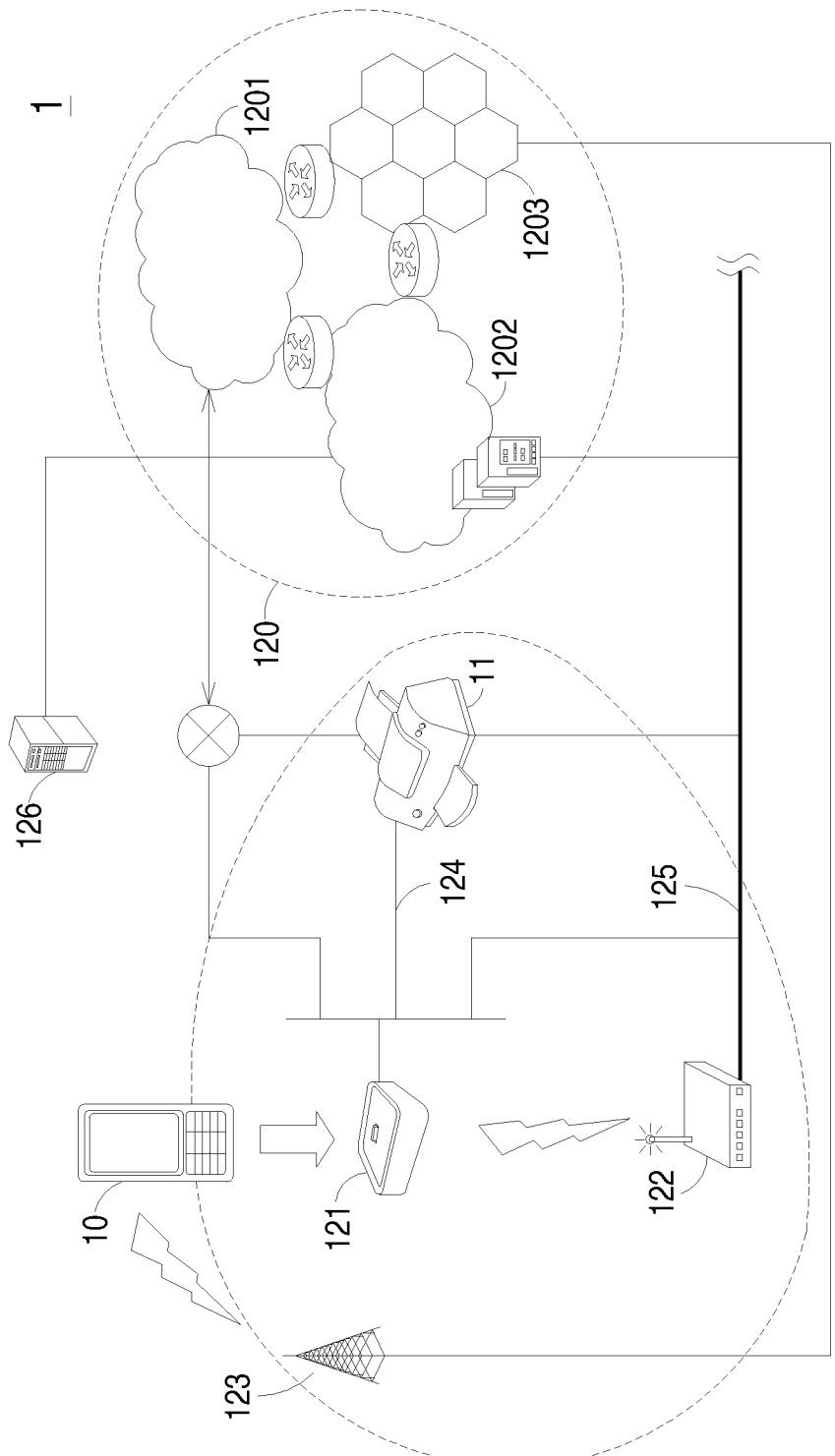
FIG. 5 schematically illustrates the architecture of a printing system according to another embodiment of the present invention.

FIG. 5 schematically illustrates the architecture of a printing system according to another embodiment of the present invention. In this embodiment, the printing system 1 further comprises a print server 126. The print server 126 is in communication with the internet 1202 of the bridge network system 120 for converting the format of the to-be-printed data. The to-be-printed data may be transmitted from the portable communication device 10 to the print server 126 through one of the plural transmission channel. After the converted data is returned back to the portable communication device 10, the portable communication device 10 performs the above printing method to print the to-be-printed data.

From the above description, the present invention provides a printing system and a printing method for a portable communication device. The printing method and the printing system automatically judge the available transmission channels and select one of the transmission channels as a priority transmission channel according to the priority values of said transmission channels. Moreover, the printing method and the printing system can automatically select an optimal transmission channel with butter transmission quality, quicker transmission speed and/or lower printing cost.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A printing system, comprising:
a portable communication device;
a printing device for receiving a to-be-printed data from said portable communication device, thereby performing a printing task; and
plural transmission channels selectively in communication with said portable communication device and said printing device for transferring said to-be-printed data to said printing device,
wherein said portable communication device comprises a controlling unit for judging and setting priority values of said transmission channels and selecting one of said transmission channels as a priority transmission channel according to said priority values of said transmission channels, so that said to-be-printed data is transmitted from said portable communication device to said printing device through said priority transmission channel,
wherein said priority value of each transmission channel includes a parameter indicating whether the communication between said portable communication device and said printing device is established, a data transmission speed of said transmission channel, data transmission cost of said transmission channel, data transmission stability of said transmission channel, and a combination thereof.

2. The printing system according to claim 1 wherein said portable communication device is a smart phone or a tablet personal computer.

3. The printing system according to claim 1 wherein said printing device is a printer or a multifunction peripheral.

4. The printing system according to claim 1 wherein said transmission channels are wired or wireless transmission channels.

5. The printing system according to claim 1 wherein said portable communication device comprises:
a communication module comprising a wireless communication unit, a mobile communication unit and a Bluetooth communication unit;
a first connecting interface;
an input unit for outputting an input signal; and
a storage unit for storing said to-be-printed data;
wherein said controlling unit is in communication with said communication module, said first connecting interface, said input unit and said storage unit, wherein in response to said input signal, said controlling unit controls said portable communication device to execute a printing program, thereby allowing said printing device to perform said printing task.

6. The printing system according to claim 5 wherein said printing program is executed by said controlling unit of said portable communication device for directly converting a format of said to-be-printed data.

7. The printing system according to claim 5 wherein said transmission channels comprise:
a first transmission channel defined by a docking station and a public switched telephone network of a bridge network system;
a second transmission channel defined by said docking station and a USB connecting wire;
a third transmission channel defined by said docking station, a local area network and an internet of said bridge network system;
a fourth transmission channel defined by a wireless network device, said local area network and said internet of said bridge network system; and
a fifth transmission channel defined by a base station and a mobile communication network, said public telephone network and said internet of said bridge network system.

8. The printing system according to claim 7 wherein said docking station is detachably connected with said portable communication device, wherein said docking station is in communication with said public switched telephone network of said bridge network system, said USB connecting wire and said local area network, wherein said wireless network device is in communication with said local area network, wherein said base station is in communication with said mobile communication network of said bridge network system, wherein said printing device is in communication with said public switched telephone network of said bridge network system, said USB connecting wire and said local area network.

9. The printing system according to claim 8 wherein said docking station comprises:
a second connecting interface to be connected with said first connecting interface of said portable communication device;
a peripheral device connecting interface comprising a first connecting port, a second connecting port and a third connecting port, which are respectively connected with said public switched telephone network, said USB connecting wire and said local area network; and
a peripheral device function processing unit connected with said second connecting interface and said peripheral device connecting interface for controlling and allocating data exchange between said second connecting interface and said peripheral device connecting interface, wherein said to-be-printed data from the portable communication device is processed by said peripheral device function processing unit or directly transmitted to said peripheral device connecting interface through said peripheral device function processing unit.

10. The printing system according to claim 8 further comprising a print server, which is in communication with said internet of said bridge network system for converting a format of said to-be-printed data.

11. A printing method, comprising steps of:
(a) providing a portable communication device, a printing device and plural transmission channels, wherein said transmission channels are selectively in communication with said portable communication device and said printing device;
(b) allowing said portable communication device to judge whether plural transmission channels between said portable communication device and said printing device are available, and setting priority values of said plural transmission channels, wherein said priority value of each transmission channel includes a parameter indicating whether the communication between said portable communication device and said printing device is established, a data transmission speed of said transmission channel, data transmission cost of said transmission channel, data transmission stability of said transmission channel, and a combination thereof;
(c) automatically selecting one of said plural transmission channels as a priority transmission channel according to said priority values of said transmission channels, and transmitting said to-be-printed data from said portable communication device to said printing device through said priority transmission channel; and (d) performing a printing task after said to-be-printed data is received by said printing device.

12. The printing method according to claim 11 wherein after said step (a), said printing method further comprises a step of directly converting a format of said to-be-printed data by said portable communication device.

13. The printing method according to claim 11 wherein after said step (a), said printing method further comprises steps of transmitting said to-be-printed data from said portable communication device to a print server through one of said transmission channels, and converting a format of said to-be-printed data by said print server.

* * * * *